(12) United States Patent
Nam (10) Patent No.: US 6,435,038 B1
(45) Date of Patent: Aug. 20, 2002

(54) ULTRASONIC FLOW VELOCITY MEASURING APPARATUS

(75) Inventor: Sang-Yong Nam, Seongnam (KR)

(73) Assignee: Chang Min Tech Co., Ltd., Seongnam (KR)

( * ) Notice: Subject to any disclaimer, the term of this patent is extended or adjusted under 35 U.S.C. 154(b) by 38 days.

(21) Appl. No.: 09/617,320

(22) Filed: Jul. 17, 2000

(30) Foreign Application Priority Data

Apr. 24, 2000 (KR) .............................................. 00-21719

(51) Int. Cl.[7] .................................................. G01F 1/66
(52) U.S. Cl. ................................. 73/861.27; 73/861.28; 73/861.29
(58) Field of Search .......................... 73/861.27, 861.28, 73/861.29, 861.31

(56) References Cited

U.S. PATENT DOCUMENTS

| | | |
|---|---|---|
| 5,531,124 A | 7/1996 | Kim et al. |
| 6,012,338 A | 1/2000 | Chang |
| 6,178,827 B1 * | 1/2001 | Feller .................... 73/861.27 |

* cited by examiner

Primary Examiner—Benjamin R. Fuller
Assistant Examiner—Corey D. Mack
(74) Attorney, Agent, or Firm—Ladas & Parry (57) ABSTRACT

An ultrasonic flow velocity measuring apparatus measures a transit time under the condition a synchronization of an ultrasonic signal having a modulated frequency by PN (pseudo noise) code of a diffusion band at a transmitting side is locked at a receiving side, and prevents an excessive measurement error exceeding allowable error range. If the installation positions of the ultrasonic transducers of upper and lower stream sides are moved, an ultrasonic transit time can be precisely measured by using a different signal series PN code without changing an electronic component and a program. In addition, the ultrasonic flow velocity measuring apparatus installs a plurality of ultrasonic transducers according to various distances from the bottom of a fluid passage, and accurately measures average flow velocity which is variable in response to the height in a curved fluid passage. Therefore, the ultrasonic flow velocity measuring apparatus can be effectively used for a larger river, a sluice open channel, or can be used for measuring a fluid quantity for gas and a water level and so on.

6 Claims, 10 Drawing Sheets

ULTRASONIC FLOW VELOCITY MEASURING APPARATUS

BACKGROUND OF THE INVENTION

1. Field of the Invention

The present invention generally relates to apparatus for measuring the flow velocity of fluid using an ultrasonic beam. More particularly, it relates to ultrasonic flow velocity measuring apparatus which generates or receives ultrasonic beam whose frequency is modulated according to PN (Pseudo Noise) code of a diffusion band of a transit side, and precisely measures a flow velocity of a pipe conduit or sluice open channel.

2. Description of the Prior Art

Conventionally, it is well known to use an ultrasonic flowmeter using ultrasonic beam in order to measure a flow quantity a large-sized pipe conduit or a larger river.

Figure 1:
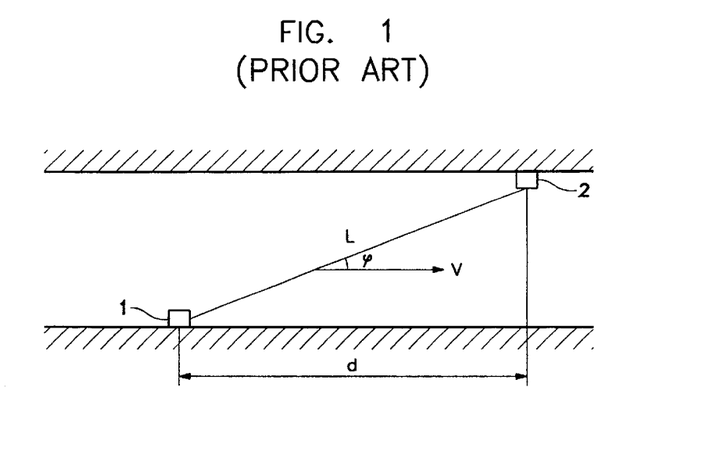
FIG. 1 illustrates an example that ultrasonic transducers are installed to be separately from each other in a conventional ultrasonic flowmeter.

The conventional ultrasonic flowmeter widely uses a flow velocity measuring method using a ultrasonic transit time difference. FIG. 1 illustrates an example that ultrasonic transducers 1 and 2 are installed to be separately from each other in a conventional ultrasonic flowmeter. The ultrasonic transducers 1 and 2 alternately generate or receive ultrasonic beam, and measures a flow velocity by using the following equation (1).

$$V = \Delta t \cdot C^2 / 2 \cdot L \cdot \cos \phi = (L^2/2d) \cdot [(t_{21} - t_{12})/(t_{12} \cdot t_{21})] \quad [\text{Eq. 1}]$$

Herein, $\Delta t$ is equal to t12 and t21 are times that ultrasonic beam is transmitted in fluid at an angle $\phi$ or on the contrary to a flow velocity direction. L is an interval between tow ultrasonic transducers, d is equal to L cos $\phi$ and C is a sound velocity in fluid (called instead of an ultrasonic transit velocity below).

The flow velocity measuring method using the ultrasonic transit time difference previously inputs a predetermined constant $L^2/2d$, and computes a time difference between a time $t_{12}$ and a time $t_{21}$, wherein the time $t_{12}$ is measured when the ultrasonic beam is emitted in a flow velocity direction, and the time $t_{21}$ is measured when the ultrasonic beam is emitted in opposite direction of the flow velocity direction of the time $t_{12}$. Such a flow velocity measuring method is well known to those skilled in the art by U.S. Pat. No. 5,531,124(Jul. 2, 1996) and Japanese Patent No. 2676321(Jul. 26, 1998).

However, according to the aforementioned prior method, if an interval L between the ultrasonic transducers is relatively longer, or various sizes of vortexes or eddies occur in the fluid flow, or the suspension concentration of fluid and a temperature distribution change in a natural river, a sound pressure of an ultrasonic beam is severely pulsated at an ultrasonic receiving place because the ultrasonic beam is refracted or diffused, or the absorbing damping factor is changed.

Furthermore, even if an ideal ultrasonic beam having a short wave length is transmitted, the receiving signal becomes a bell-shaped pulse, because the higher harmonic component of the ultrasonic beam is severely damped. For it, a receiving error corresponding to a few periods of the ultrasonic beam usually happens in checking out the moment that the ultrasonic beam is received, and the receiving failure case is not quite less.

In order not to distort the shape of the received pulse in transmitting and receiving the ultrasonic beam, a wideband amplifier is used, but various noises are amplified. Especially, it causes the confusion in measuring the ultrasonic transmitting time due to the pulse noises.

In considering the above problems, another prior art which measures an ultrasonic transit time by emitting or receiving a frequency-modulated ultrasonic beam and obtains a flow velocity is disclosed in U.S. Pat. No. 6,012,338 which is shown in FIG. 2.

Figure 2:
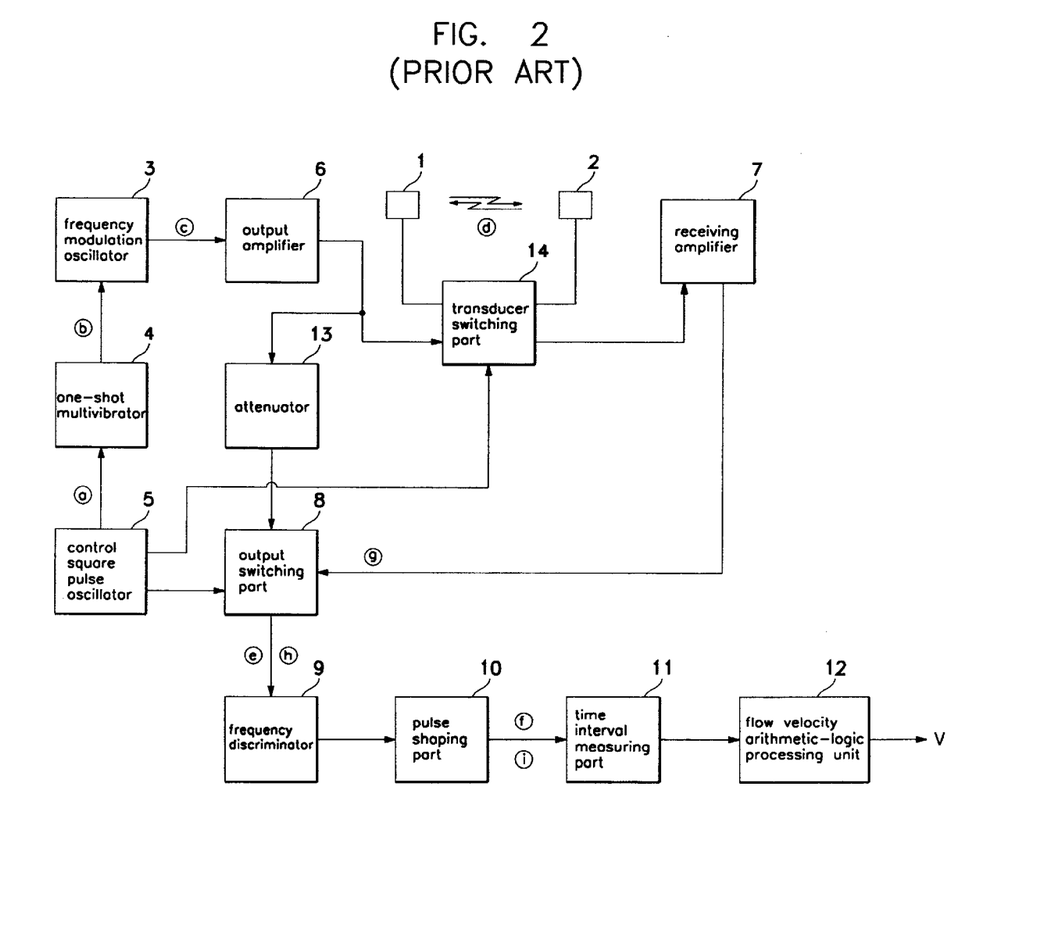
FIG. 2 is a block diagram of: an ultrasonic flow velocity measuring apparatus according to a prior art.
Figure 3:
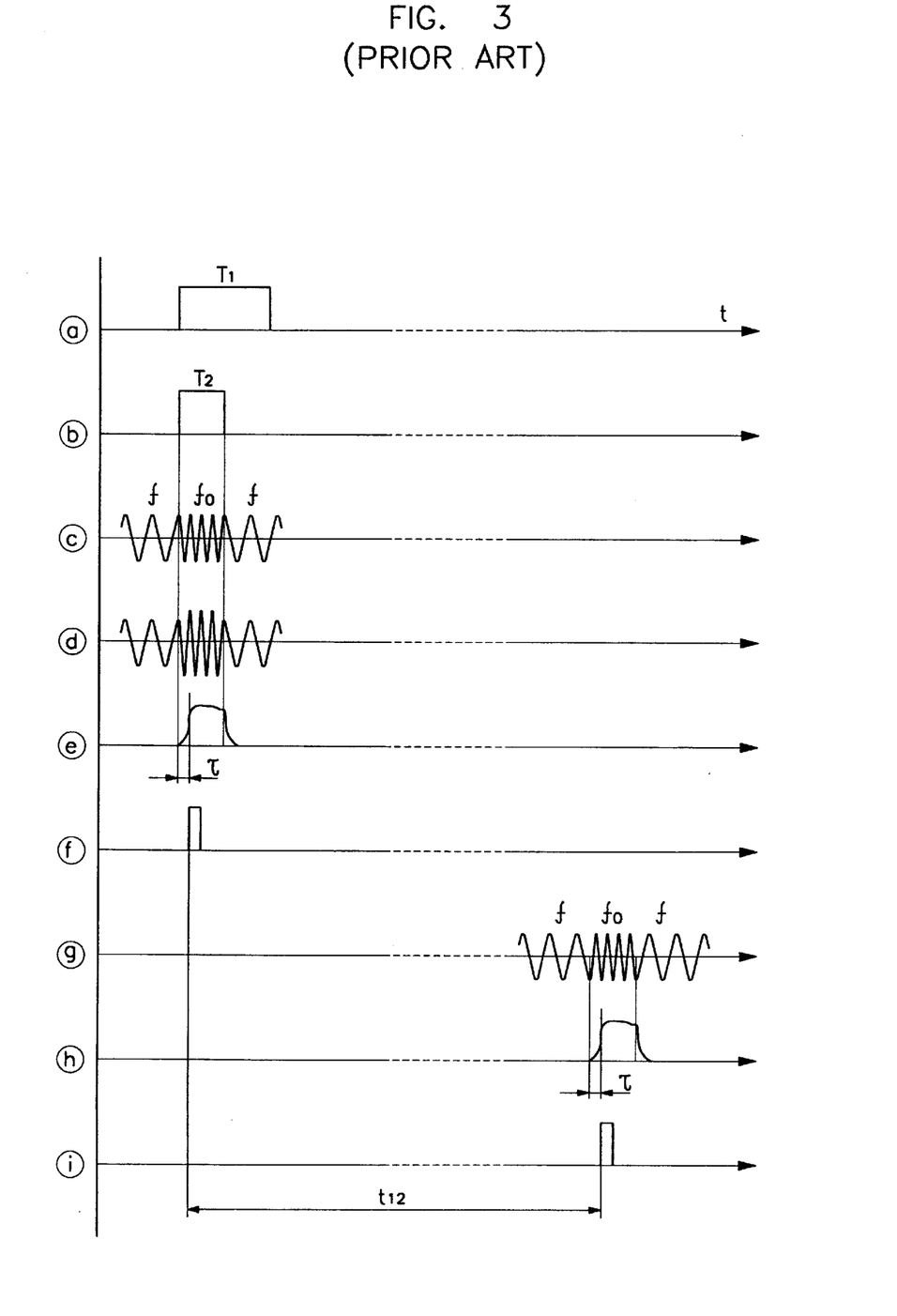
FIG. 3 respectively illustrates a pulse waveform of each part of FIG. 2.

As shown in FIG. 2, a frequency modulation oscillator 3 is connected to a transducer switching part 14 through an output amplifier 6. A pair of ultrasonic transducers 1 and 2 are connected to the transducer switching part 14. The ultrasonic modulation oscillator (3) connected to an input terminal of the output amplifier 6 successively outputs an oscillation frequency f when there is no pulse input from an one-shot multivibrator 4, and outputs a frequency fo (shown in FIG. 3c) which is modulated according to a short pulse (shown in FIG. 3b) generated from the one-shot multivibrator 4 by a long pulse (shown in FIG. 3a) generated from a control square pulse oscillator 5 with a given period.

The frequencies f and fo generated from the frequency modulation oscillator 3 pass through the output amplifier 6, and are input to the transducer switching part 14. The transducer switching part 14 inputs the amplified frequencies f and fo into the ultrasonic transmitting transducer 1. The ultrasonic transmitting transducer 1 successively emits the oscillation frequency f and a frequency-modulated frequency fo as shown in FIG. 3d. The ultrasonic receiving transducer 2 installed to a lower place of the ultrasonic transmitting transducer 1 receives the oscillation frequency f and the frequency-modulated frequency fo.

At this time, the output signal of the output amplifier 6 is transmitted to a frequency discriminator 9 through an attenuator 13 and the output switching part 8. The frequency discriminator 9 generates an output voltage (shown in FIG. 3e) during a duration time of the frequency fo. The output voltage of FIG. 3e is changed to a square pulse by a pulse shaping part 10, as shown in FIG. 3f. A time interval measuring part 11 starts a counting operation from a moment at which the square pulse is received. After that, at the moment of a pulse trailing edge, an output switching part 8 and the transducer switching part 14 are switched according to a control of the control square pulse oscillator 5, an output signal (shown in FIG. 3g) of the receiving amplifier 7 is input to the frequency discriminator 9, and an output voltage (shown in FIG. 3h) are changed to a square pulse (shown in FIG. 3i) by the pulse shaping part 10 and is then transmitted to the time interval measuring part 11. At this time, the time interval measuring part 11 stops a counting operation. In addition, the time interval measuring apparatus outputs the counted ultrasonic transit time $t_{12}$ to a flow velocity arithmetic-logic processing unit 12.

After that, the transducer switching part 14 transmits an output signal of the output amplifier 6 to the ultrasonic receiving transducer 2 by a control of the control square pulse oscillator 5, and emits the ultrasonic beam having a modulated frequency to the ultrasonic transmitting transducer 1. By the aforementioned operation steps, a ultrasonic transit time $t_{21}$ are measured. The flow velocity arithmetic-logic processing unit 12 receives a time $t_{21}$ having an opposite direction of the time $t_{21}$ from the time interval measuring part 11, and calculates a flow velocity by using the above equation (1).

The aforementioned prior art of U.S. Pat. No. 6,012,338 measures an ultrasonic transit time by catching a moment at which a frequency of a receiving signal is changed, and thus measures it even in a condition of a sound pressure of ultrasonic beam is pulsated.

Figure 4:
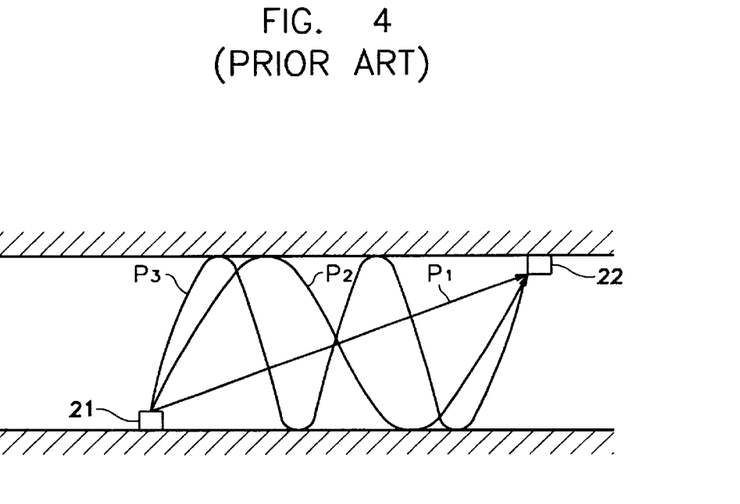
FIG. 4 illustrates an ultrasonic transmission path between the ultrasonic transducers of FIG. 2.
Figure 5:
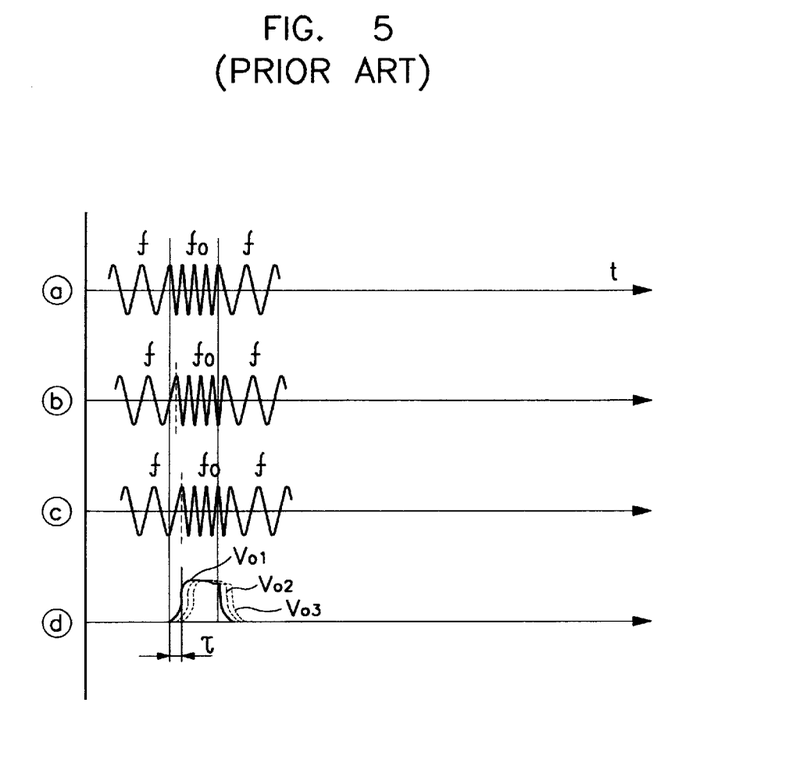
FIG. 5 illustrates an output voltage of a frequency discriminator of FIG. 2.

However, the ultrasonic beam generated from the ultrasonic transmitting transducer 1 is reflected from a surface or a bottom, and is transmitted to the ultrasonic receiving transducer 2 after a delay operation, so that it is difficult to capture accurate frequency modulation time point. In other words, as shown in FIG. 4, when the ultrasonic transmitting transducer 1 emits an ultrasonic beam to the ultrasonic receiving transducer 2, the ultrasonic beam is transmitted to the ultrasonic receiving transducer 2 via a multiple-path. For example, the ultrasonic beam through first to third path P1, P2 and P3 has a predetermined phase difference (shown in FIGS. 5a–5c) according to a path difference. At this time, as shown in FIG. 5d, there are many output voltages Vo1, Vo2 and Vo3 in the frequency discriminator 9. Due to Vo1, Vo2 and Vo3, at a receiving side, the moment at which an oscillation frequency f is changed to a frequency-modulated frequency fo is not adequately detected, thereby causing a measurement error.

For example, under the condition that a time interval L between two ultrasonic transducers 1 and 2 is very short (e.g., 0.05 m), a flow velocity V is very slow (e.g., 0.1 m/s), and a sound velocity C is about 1500 m/s, if the measurement error is excluded, the ultrasonic transit time at is to be a value of $3.14 \cdot 10^{-9}$ s. When the ultrasonic transit time $\Delta t$ is measured within allowable error range of 1% at a high precision, absolute error of the measured transit time differences should not exceed a value of $3 \cdot 10^{-11}$ s. For this condition relating the absolute error, the transit time measuring apparatus becomes complicated, apparatus for capturing a receiving moment of ultrasonic modulated pulse should be a very stable and precise system, thereby increasing a cost of a manufactured product.

In addition, the flow velocity in a curved passage occurs a large flow velocity deviation at a different measuring place, so that a plurality of ultrasonic transducers should be installed to measure an ultrasonic transit time difference. But, if only two transducers are used like the above prior art, the measurement error of a flow velocity becomes wider, so that a precise measurement operation is not achieved.

SUMMARY OF THE INVENTION

The present invention has been made in an effort to solve the above problems. It is a first object of the present invention to provide an ultrasonic flow velocity measuring apparatus which measures a transit time under the condition a synchronization of an ultrasonic signal having a modulated frequency by PN (pseudo noise) code of a diffusion band at a transmitting side is locked at a receiving side, and prevents an excessive measurement error exceeding allowable error range.

It is a second object of the present invention to provide an ultrasonic flow velocity measuring apparatus, wherein a transmitting side and a receiving side use the same PN code, and thus the receiving side receives its own ultrasonic modulation signal even if several pairs of ultrasonic transducers are used.

It is a third object of the present invention to provide an ultrasonic flow velocity measuring apparatus which installs a plurality of ultrasonic transducers to every position, and accurately measures average flow velocity in a curved passage.

To achieve the first object, in an ultrasonic flow velocity measuring apparatus which installs a pair of transducers at a upper stream and a lower stream of a fluid passage and measures a flow velocity according to an ultrasonic transit time difference between the ultrasonic transducers, an ultrasonic flow velocity measuring apparatus includes: a transmitting part for generating an ultrasonic signal having a modulated frequency according to a PN code of a diffusion band; a transducer switching part for alternately applying the ultrasonic signal from the transmitting part to a pair of ultrasonic transducers, and switching a connection state of the pair of ultrasonic transducers for a transmitting or receiving operation; a receiving part for demodulating an output signal of the transducer switching part, and capturing a moment at which its own signal is identical with a signal of the transmitting part; a signal synchronization part for locking a synchronization of a receiving signal when the receiving part captures a signal; a time interval measuring part for measuring an ultrasonic transit time under the condition that a synchronization of a receiving signal is locked in the signal synchronization part; and a controller for controlling a switching operation of the transducer switching part, and calculating a flow velocity according to an ultrasonic transit time in opposition to a flow velocity measured by the time interval measuring part.

The transmitting part is comprised of a transmitting PN code generator, a frequency modulator, and an output amplifier. The transmitting PN code generator includes an oscillator of generating a clock signal of a predetermined period therein, and generates PN code which is determined by a high-level pulse width and a low-level pulse width according to a clock signal generated by the oscillator.

The receiving part is comprised of a receiving amplifier, a frequency demodulator, and a signal capturing part. The signal capturing part detects a moment at which a demodulated signal series is identical with a PN code signal series generated from the transmitting PN code generator.

The signal synchronization part is comprised of first and second synthesizers, first and second LPFs (low pass filters), a differential amplifier, a loop filter, a VCO (voltage controlled oscillator), and a receiving PN code generator. The receiving PN code generator generates the same PN code as an output signal series of the transmitting PN code generator according to an input frequency of the VCO oscillator, after receiving an enable signal from the signal capturing part. Then, the receiving PN code generator generates a PN code of which phase is leading by a predetermined period of the first synthesizer, and generates a PN code of which phase is lagged by a predetermined period of the second synthesizer.

According to a second object, in an ultrasonic flow velocity measuring apparatus which installs a pair of transducers at a upper stream and a lower stream of a fluid passage and measures a flow velocity according to an ultrasonic transit time difference between the ultrasonic transducers, an ultrasonic flow velocity measuring apparatus includes: a transmitting part for selecting one PN code among a plurality of PN code signal series according to a signal selection signal, and generating an ultrasonic signal having a modulated frequency according to the selected PN code; a transducer switching part for alternately applying the ultrasonic signal from the transmitting part to a pair of ultrasonic transducers, and switching a connection state of the pair of ultrasonic transducers for a transmitting or receiving operation; a receiving part for demodulating an output signal of the transducer switching part, and capturing a moment at which its own signal is identical with a signal of the transmitting part; a signal synchronization part for locking a synchronization of a receiving signal when the receiving part captures a signal; a time interval measuring part for measuring an ultrasonic transit time under the condition that a synchronization of a receiving signal is locked in the signal synchronization part; and a controller which generates a signal selection signal for selecting one PN code among a plurality of PN code signal series at the transmitting part, and calculates a flow velocity according to an ultrasonic transit time in opposition to a flow velocity measured by the time interval measuring part.

According to a third object, an ultrasonic flow velocity measuring apparatus includes: a plurality of set units which emit or receive an ultrasonic beam having a modulated frequency according to a different PN code, and measure an ultrasonic transit time; and a controller which collects the ultrasonic transit times measured by the plurality of set units, and calculates average flow velocity.

The set unit includes: a plurality of ultrasonic transducers which are disposed to be faced to each other at a different height at a upper stream and a lower stream of a fluid passage; a transmitting part for generating an ultrasonic signal having a modulated frequency according to a predetermined PN code; a transducer switching part for alternately applying the ultrasonic signal from the transmitting part to a pair of ultrasonic transducers, and switching a connection state of the pair of ultrasonic transducers for a transmitting or receiving operation; a receiving part for demodulating an output signal of the transducer switching part, and capturing a moment at which its own signal is identical with a signal of the transmitting part; a signal synchronization part for locking a synchronization of a receiving signal when the receiving part captures a signal; and a time interval measuring part for measuring an ultrasonic transit time under the condition that a synchronization of a receiving signal is locked in the signal synchronization part.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

A preferred embodiment of the present invention will now be described in detail with reference to the accompanying drawings.

Figure 6:
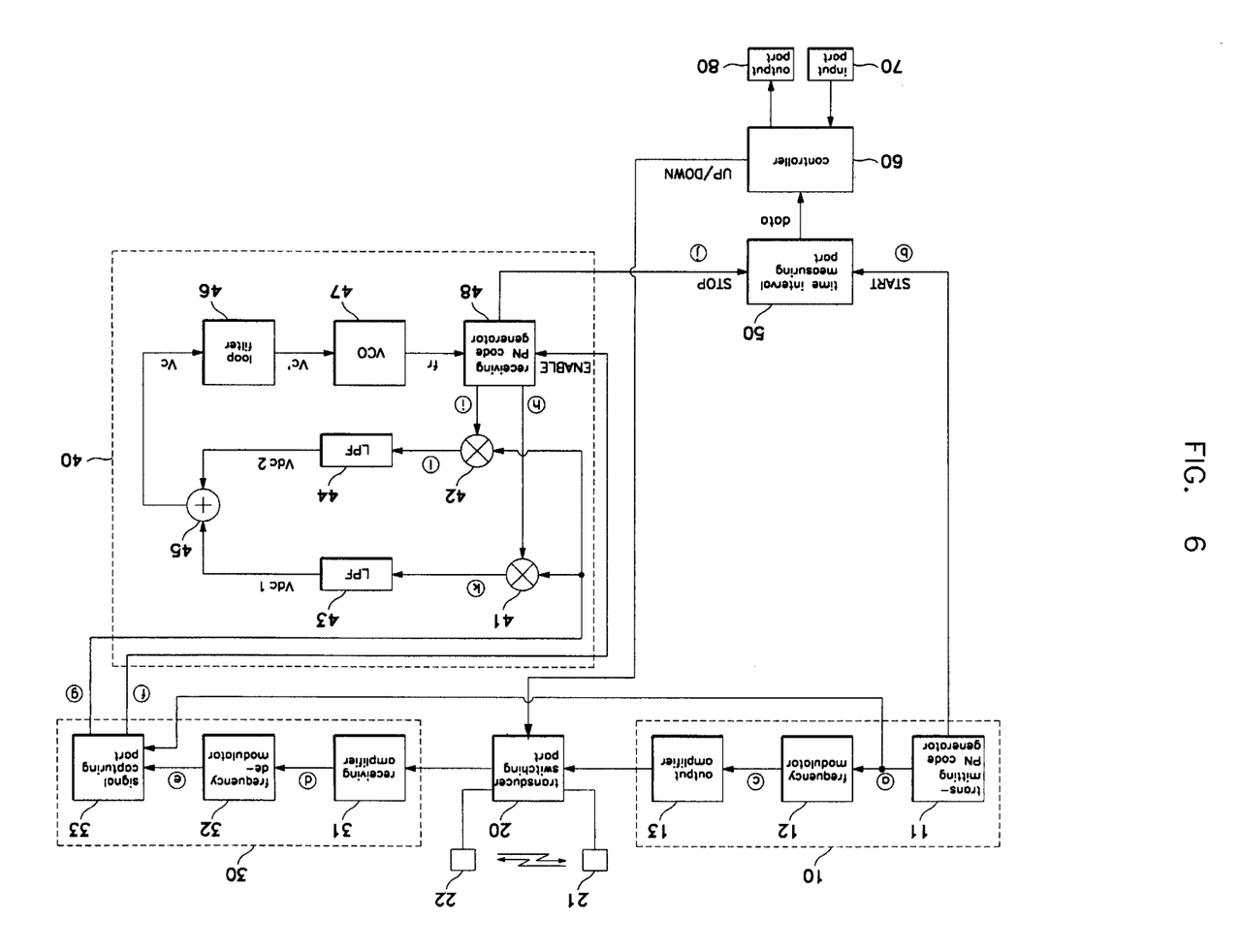
FIG. 6 is a block diagram of an ultrasonic flow velocity measuring apparatus according to a preferred embodiment of the present invention.

FIG. 6 is a block diagram of an ultrasonic flow velocity measuring apparatus according to a preferred embodiment of the present invention.

As shown in FIG. 6, the ultrasonic flow velocity measuring apparatus includes:

a transmitting part 10 for generating an ultrasonic signal having a modulated frequency according to a PN code of a diffusion band;

a transducer switching part 20 for alternately applying an output signal of the transmitting part 10 to a pair of ultrasonic transducers 21 and 22, and outputting the received signals of the ultrasonic transducers 21 and 22;

a receiving part 30 for demodulating an output signal of the transducer switching part 20, and capturing it;

a signal synchronization part 40 for being connected to an output terminal of the receiving part 30, and locking a synchronization of a captured signal;

a time interval measuring part 50 for counting an ultrasonic transit time under the condition that a signal synchronization is locked in the signal synchronization part 40, and converting a counted value to a data; and a controller 60 for controlling a switching operation of the transducer switching part 20 in order to make the ultrasonic transducers 21 and 22 alternately emit or receive an ultrasonic modulation signal, receiving an output data of the time interval measuring part 50, and calculates a flow velocity.

The controller 60 is connected to an input part 70 and an output part 80. The input part 70 determines an initial value for calculating a flow velocity by a user, and commonly has a keypad thereon. The output part 80 displays a calculated flow velocity by the controller 60, and has a display device such as a seven segment or LCD panel thereon.

The ultrasonic transducers 21 and 22 are separately installed to a pipe conduit or a sluice open channel. The ultrasonic transducer 21 is installed to a upper stream of a fluid passage. The ultrasonic transducer 22 is installed to a lower stream of a fluid passage.

The transmitting part 10 is comprised of a transmitting PN code generator 11, a frequency modulator 12 and an output amplifier 13. The transmitting PN code generator 11 includes an oscillator of generating a clock signal of a predetermined period therein, and successively outputs a PN code of a spread spectrum according to the clock signal from the oscillator, simultaneously with periodically outputting a start signal START to the time interval measuring part 50. The PN code means a pulse series in which one signal series determined by a high-level pulse width and a low-level pulse width are repeated at a predetermined period. The frequency modulator 12 outputs a first frequency f1 in a period wherein a high level of PN code is maintained, and outputs a second frequency ($f2=f1+\Delta f$) in a period wherein a low level of PN code is maintained.

The output amplifier 13 amplifies the modulated first and second frequencies f1 and f2 with a predetermined level, and outputs them to the transducer switching part 20.

By the transducer switching part 20, the upper stream side ultrasonic transducer 21 transmits the modulated first and second frequencies f1 and f2 to the lower stream side ultrasonic transducer 22. On the contrary, the lower stream side ultrasonic transducer 22 transmits the modulated first and second frequencies f1 and f2 to the upper stream side ultrasonic transducer 21. Such a switching operation of the transducer switching part 20 is achieved by a switching control signal UP/DOWN of the controller 60.

The receiving part 30 is comprised of a receiving amplifier 31, a frequency demodulator 32, and a signal capturing part 33. The receiving amplifier 31 receives a weak signal received by one between the ultrasonic transducers 21 and 22 through the transducer switching part 20, and amplifies the input weak signal with a predetermined amplification level. The frequency demodulator 32 demodulates a receiving signal amplified with a predetermined level, and outputs a demodulated signal. The signal capturing part 33 detects a moment at which a demodulated signal series is identical with a PN code signal series generated from the transmitting PN code generator 11. At this moment, the signal capturing part 33 simultaneously outputs both an enable signal ENABLE and the PN code signal series to the signal synchronization part 40.

The signal synchronization part 40 is comprised of first and second synthesizers 41 and 42, first and second LPFs 43 and 44, a differential amplifier 45, a loop filter 46, a voltage controlled oscillator (VCO) 47, and a receiving PN code generator 48. The first and second synthesizers 41 and 42 are respectively connected to an output terminal of the signal capturing part 33 and an output terminal of the receiving PN code generator 48. The first synthesizer 41 synthesizes an output signal of the signal capturing part 33 with the same series PN code (whose phase is leading by a predetermined period) generated from the receiving PN code generator 48, and generates a synthesized signal. The second synthesizer 42 synthesizes an output signal of the signal capturing part 33 with the same series PN code (whose phase is lagged by a predetermined period), and generates a synthesized signal. The first and second LPFs 43 and 44 are connected to the output terminals of the first and second synthesizers 41 and 42, and remove unnecessary high frequency component mixed during the synthesizing operation. The differential amplifier 45 performs a differential amplification in proportion to a signal difference between a DC component voltage signal Vdc1 filtered by the first LPF 43 and a DC component voltage signal Vdc2 filtered by the second LPF 44, and generates a control voltage Vc for controlling the VCO 47. The loop filter 46 removes a noises mixed in a differential-amplified control voltage Vc from the differential amplifier 45. The VCO 47 varies a reference frequency fr according to a control voltage Vc' having no noise. After receiving the enable signal ENABLE from the signal capturing part 33, the receiving PN code generator 48 generates the same series PN code as an output signal series of the transmitting PN code generator 11 according to an input frequency from the VCO 47. After that, the receiving PN code generator 48 generates a PN code of which phase is leading by a predetermined period of the first synthesizer, and generates a PN code of which phase is lagged by a predetermined period of the second synthesizer.

PN code transmitted to the first synthesizer 41 from the receiving PN code generator 48 is input to be faster than a receiving signal series PN code transmitted to the first synthesizer 41 from the signal capturing part 33, is faster than the receiving signal series PN code by a predetermined time. At the same time, a PN code being input from the receiving PN code generator 48 to the second synthesizer 42 is generated from the signal capturing part 33, and is lagging than the receiving signal series PN code being input to the second locked, the receiving PN code generator 48 outputs a completion signal STOP to the time interval measuring part 50.

Under the condition that the signal synchronization is locked, the time interval measuring part 50 counts an ultrasonic transit time from a moment of receiving the starting signal START of the transmitting PN code generator 11 to another moment of receiving the completion signal STOP of the receiving PN code generator 48.

The time interval measuring part 50 converts the counted value to a data, and outputs the data to the controller 60.

The controller 60 previously receives initial values such as a straight distance L and an interval L between two ultrasonic transducers 21 and 22, and memorizes the initial values, and calculates a flow velocity V by inserting an output data (i.e., ultrasonic transit time) of the time interval measuring part 25 into the following equation (2).

$$V=(L^2/2d)\cdot[(t_{ba}-t_{ab})/(t_{ba}\cdot t_{ab})] \qquad \text{Eq. (2)}$$

Herein, $t_{ab}$ is an ultrasonic transit time measured when the ultrasonic transducer 21 transmits ultrasonic beam to the ultrasonic transducer 22, and $t_{ba}$ is an ultrasonic transit time measured when the ultrasonic transducer 22 transmits ultrasonic beam to the ultrasonic transducer 21.

The controller 60 outputs a calculation result to the output part 80. Accordingly, the output part 80 displays a flow velocity V on a display device by using a number or a character.

Hereinafter, the operations of the ultrasonic flow velocity measuring apparatus will now be described below.

Each part consisting of the apparatus receives a power-supply as an input, the user applies a driving command by using the input part 70. Accordingly, input, the user applies a driving command by using the input part 70. Accordingly, the controller 60 outputs a first switching signal UP to the transducer switching part 20. The transducer switching part 20 receiving the first switching signal UP connects the ultrasonic transducer 21 to an output terminal of the transmitting part 10, simultaneously with connecting the ultrasonic transducer 22 to an input terminal of the receiving part 30.

Figure 7:
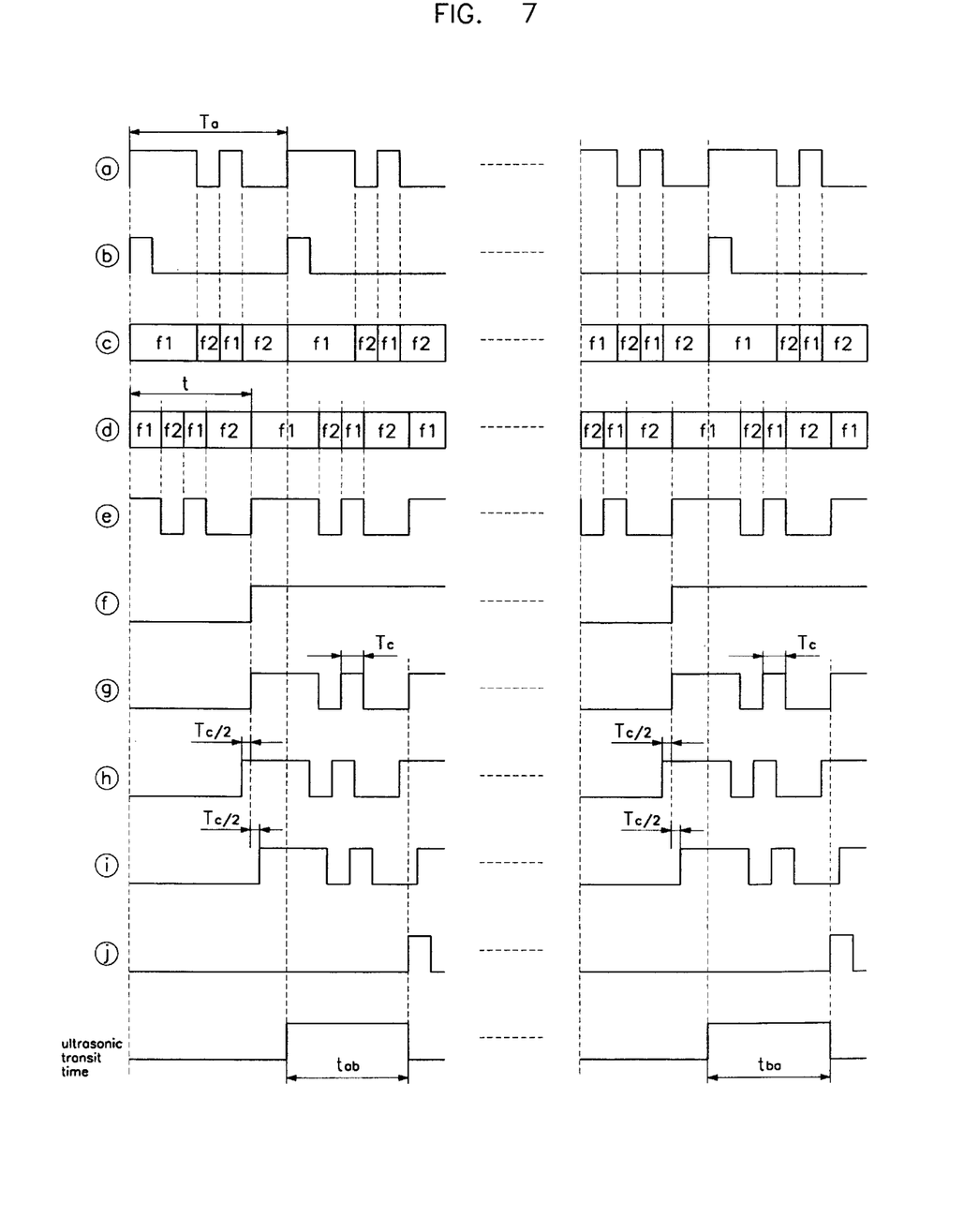
FIG. 7 respectively illustrates a pulse waveform of each part of FIG. 6.

The transmitting PN code generator 11 outputs a PN code (shown in FIG. 7a) of a signal series consisting of both a high level signal and a low level signal according to a clock signal of a predetermined period Tc, the clock signal being generated from an inside oscillator of the PN code generator 11, to the frequency modulator 12 and the signal capturing part 33. Simultaneously with this, the transmitting PN code generator 11 repeatedly generates a starting signal (shown in FIG. 7b) at a predetermined period Ta. The frequency modulator 12 generates a predetermined first frequency f1 during a high-level duration period of PN code, and generates a predetermined second frequency (f2=f1+Δf, shown in FIG. 7C) during a low-level duration period of PN code. The output amplifier 13 amplifies the ultrasonic signal having a modulated frequency with a predetermined level, and then outputs the amplified ultrasonic signal. The ultrasonic modulation signal is applied to the ultrasonic transducer 21 through the transducer switching part 20, therefore, the ultrasonic transducer 21 transmits a modulated ultrasonic signal to the ultrasonic transducer 22.

The signal received in the ultrasonic transducer 22 is input to the receiving amplifier 31 through the transducer switching part 20. The receiving amplifier 31 amplifies a received weal ultrasonic modulation signal with a predetermined level, and outputs the amplified signal (shown in FIG. 7d) to the frequency demodulator 32. The frequency demodulator 32 demodulates the amplified receiving signal, and outputs the demodulated signal (shown in FIG. 7e) to the signal capturing part 33. The signal capturing part 33 detects a moment at which a demodulated signal series is identical with a signal series of PN code generated from the transmitting PN code generator 11. During an initial transient state, the both signal series are not identical to each other. After a predetermined time (t), the both signal series are identical to each other. At this time, the signal capturing part 33 outputs both an enable signal ENABLE which is changed to a high level signal on the capturing time point of the signal capturing part 33 and an output PN code (shown in FIG. 7g) of the transmitting PN code generator 11 to the signal synchronization part 40.

The receiving PN code generator 48 receives the enable signal ENABLE, and inputs PN code having a different phase according to a reference frequency fr generated from the VCO 47 to the first synthesizer 41, simultaneously with inputting, wherein the PN code having a different phase has a leading phase as compared with the PN code of FIG. 7g. At the same time, the receiving PN code generator 48 inputs another PN code having a lagging phase as compared with the PN code of FIG. 7g to the second synthesizer 42.

Figure 8:
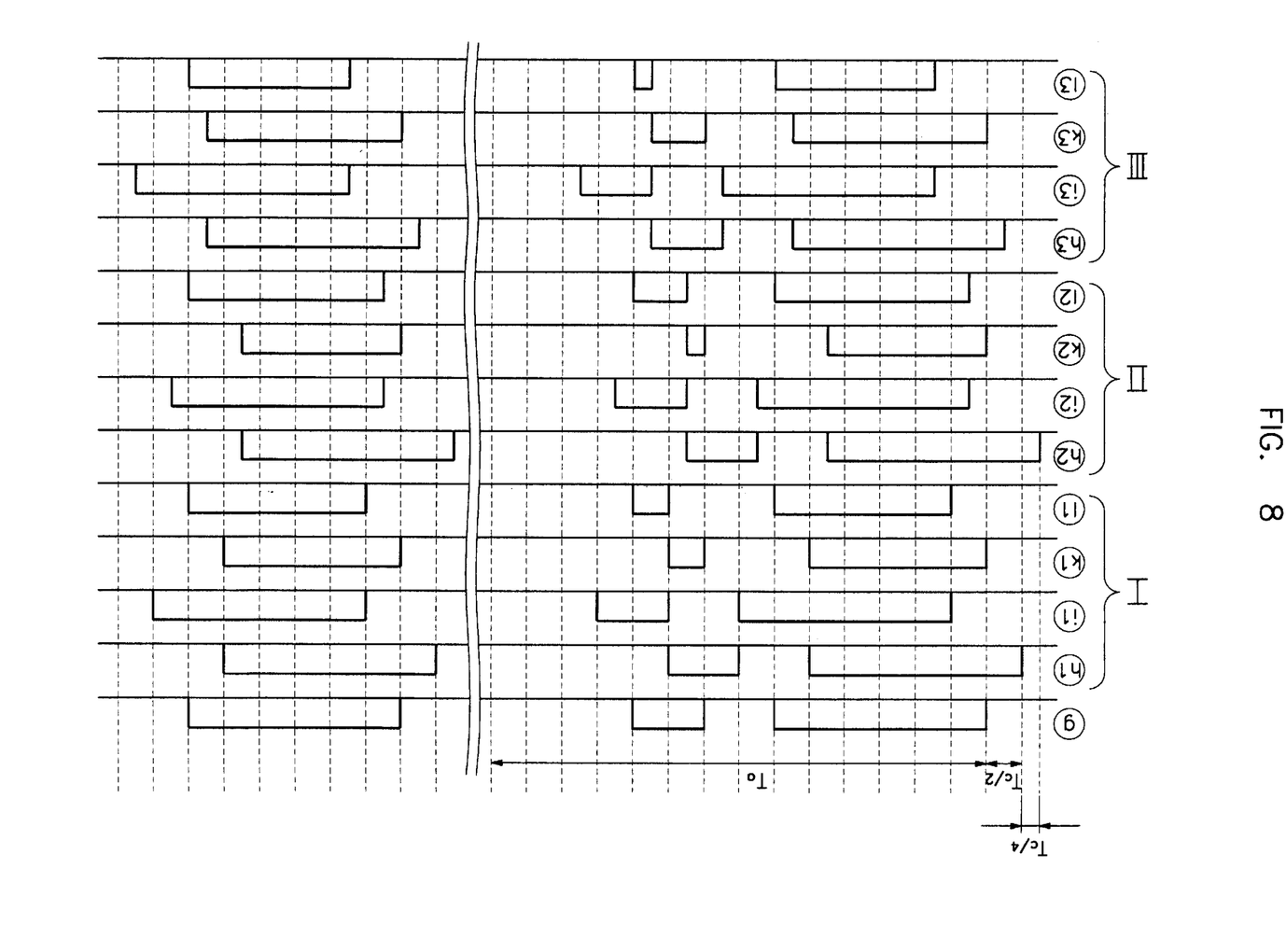
FIG. 8 illustrates a pulse waveform for explaining an operation of a signal synchronization part of FIG. 6.

The first and second synthesizers 41 and 42 synthesizes the two input PN codes therebetween, and outputs the synthesized signals (shown in FIGS. 8(k1) and 8(l1)) to the first and second LPFs 43 and 44. The first and second LPFs 43 and 44 remove unnecessary high frequency component, and output DC component voltage signals Vdc1 and Vdc2 to the differential amplifier 45. The differential amplifier 45 outputs a control voltage Vc in proportion to a voltage difference between the two voltage signals Vdc1 and Vdc2 to a loop filter 46. The loop filter 46 outputs a control voltage Vc' removing the mixed noise to the VCO 47. While the VCO 47 outputs the reference frequency fr, the CO 47 varies the reference frequency fr according to the input control voltage Vc' from the loop filter 46, and outputs a varied frequency to the receiving PN code generator 48. Accordingly, the receiving PN code generator 48 varies a phase of the PN code being input to the first and second synthesizers 41 and 42.

At this time, if the phase of the PN code being input to the first synthesizer 41 is leading (shown in FIG. 7h) by a predetermined period Tc/2 as compared with an output PN code (shown in FIG. 7g) of the signal capturing part 33, and the phase of the PN code being input to the second synthesizer 42 is lagging (shown in FIG. 7i) by the predetermined period Tc/2 as compared with the output PN code (shown in FIG. 7g) of the signal capturing part 33, that is, if the PN code of FIG. 7g is placed to a center position, the signal synchronization part 40 locks a signal synchronization, and then traces a receiving signal. If one period elapses under the signal locking state, the receiving PN code generator 48 outputs a completion signal STOP to the time interval measuring part 50. Under the locking state, the time interval measuring part 50 counts an ultrasonic transit time $t_{ab}$ during a time period from a moment of receiving the starting signal START (from the transmitting PN code generator 11) to another moment of receiving the completion signal STOP (from the receiving PN code generator 48).

Then, the controller 60 outputs a second switching signal DOWN to the transducer switching part 20. Therefore, the transducer switching part 20 connects the ultrasonic transducer 22 to the output terminal of the transmitting part 10, and connects the ultrasonic transducer 21 to an input terminal of the receiving part 30. Thereafter, an ultrasonic signal having a modulated frequency according to a PN code of a spread spectrum is transmitted to the ultrasonic transducer 21 through the ultrasonic transducer 21. A signal received by the ultrasonic transducer 21 is demodulated and captured in the receiving part 30. The time interval transducer 50 counts an ultrasonic transit time $t_{ba}$ during a time period from a moment of receiving the starting signal START (from the transmitting PN code generator 11) to another moment of receiving the completion signal STOP (from the receiving PN code generator 48).

However, if the PN codes (shown in FIGS. 7h and 7i) being input to the first and second synthesizers 41 and 42 deviate from the predetermined period Tc/2 (i.e., an initial transient state), an output reference frequency fr of the VCO 47 is varied according to a control voltage Vc amplified by the differential amplifier 45 by a voltage difference between the output voltages of the first and second LPFs 43 and 44. As a result, the receiving PN code generator 48 varies each phase of PN codes being input to the first and second synthesizers 41 and 42. There are two kinds of the varied phases of PN codes, i.e, a second signal style (shown in FIG. 8II) which is leading by a predetermined period Tc/4 as compared with the first signal style (shown in FIG. 8I), and a third signal style (shown in FIG. 8III) is lagging by a predetermined period Tc/4 as compared with the first signal style of FIG. 8I wherein a signal synchronization is locked. If the reference phase is deviated like the second and third signal styles, the reference frequency fr of the VCO 47 is varied by a control voltage Vc from the differential amplifier 45. As a result, the receiving PN code generator 48 varies a phase of PN code being input to the first and second synthesizers 41 and 42. Finally, the phase of the first and second synthesizers 41 and 42 are changed to the first signal style I.

In the meantime, the transmitting PN code generator 11 and the receiving PN code generator 48 use the same signal series PN codes. A period Ta of such a PN code is properly set according to a distance between the ultrasonic transducers 21 and 22. If the installation positions of the ultrasonic transducers 21 and 22 are changed, the period Ta is to be shorter as compared with an ultrasonic transit time, thus one PN code among many signal series PN codes having a different period is selected and used. This case will now be described with reference to FIG. 9.

Figure 9:
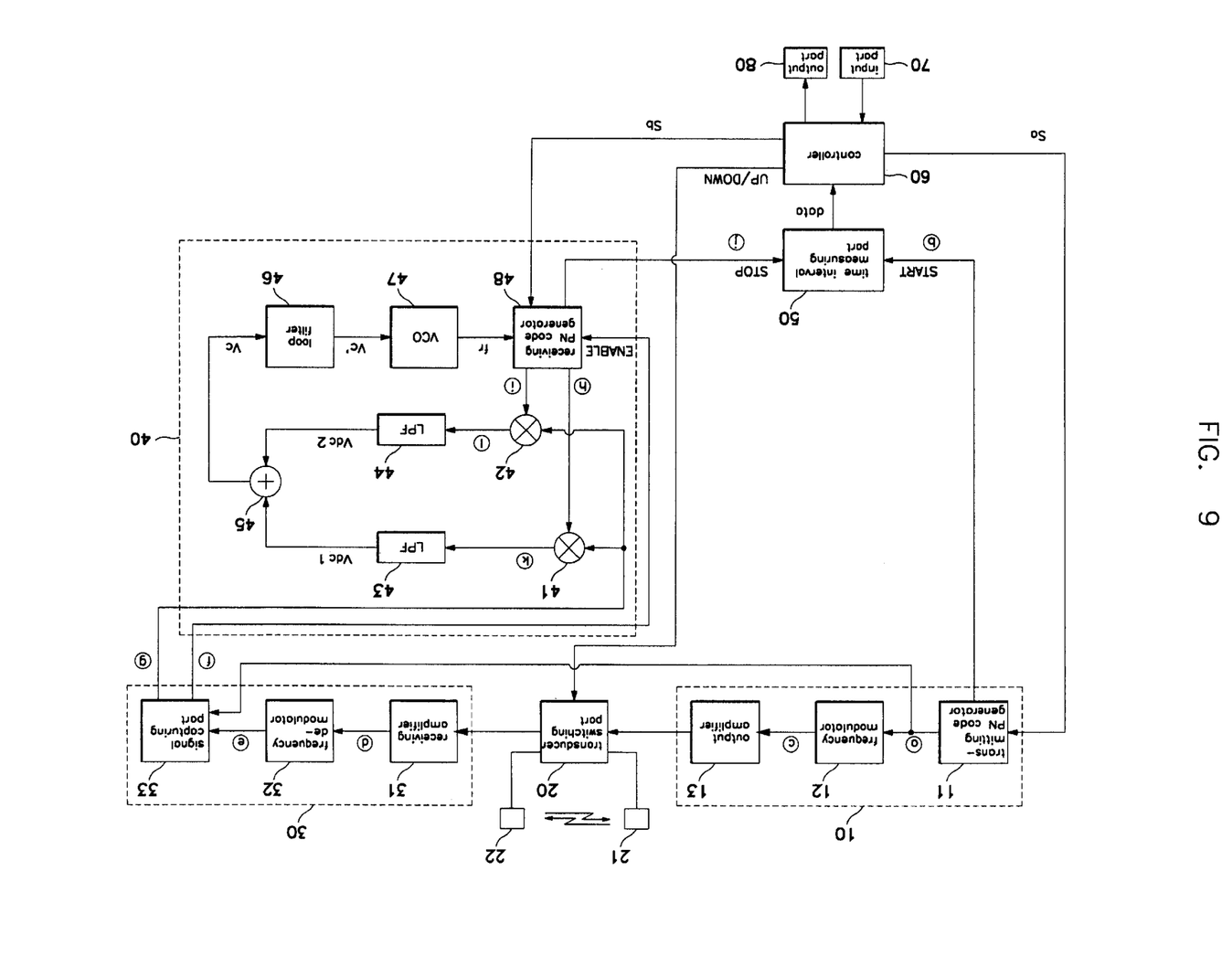
FIG. 9 is a block diagram of an ultrasonic flow velocity measuring apparatus according to a second preferred embodiment of the present invention.

FIG. 9 is a block diagram of an ultrasonic flow velocity measuring apparatus according to a second preferred embodiment of the present invention. The same parts as FIG. 6 will not be described below.

As shown in FIG. 9, the transmitting PN code generator 11 and the receiving PN code generator 48 have another a signal series of another period (3+n bit) in addition to a signal series of a predetermined period (Ta;3bit) shown in FIG. 8, and can be embodied as a plurality of oscillators and flip-flops.

If the user inputs a signal series setting command for changing a signal series of PN code by using the input part 70, the controller 60 outputs signal series selection signals Sa and Sb to the transmitting PN code generator 11 and the receiving PN code generator 48 according to the user-selected command.

The transmitting PN code generator 11 outputs a PN code of a signal series selected by the signal series selection signal Sa from the controller 11. The receiving PN code generator 48 outputs a PN code of a signal series selected by the signal series selection signal Sa from the controller 11. Of course, an output signal series of the transmitting PN code generator 11 should be identical with that of the receiving PN code generator 48.

In the meantime, a considerable deviation occurs in a flow velocity of a curved fluid passage outlet according to a height. For example, since a flow of fluid is constant in a straight fluid passage, a flow velocity of a lower part of the fluid passage and a flow velocity of a upper part of the fluid passage are relatively uniform as shown in FIG. 10(V1).

Figure 10:
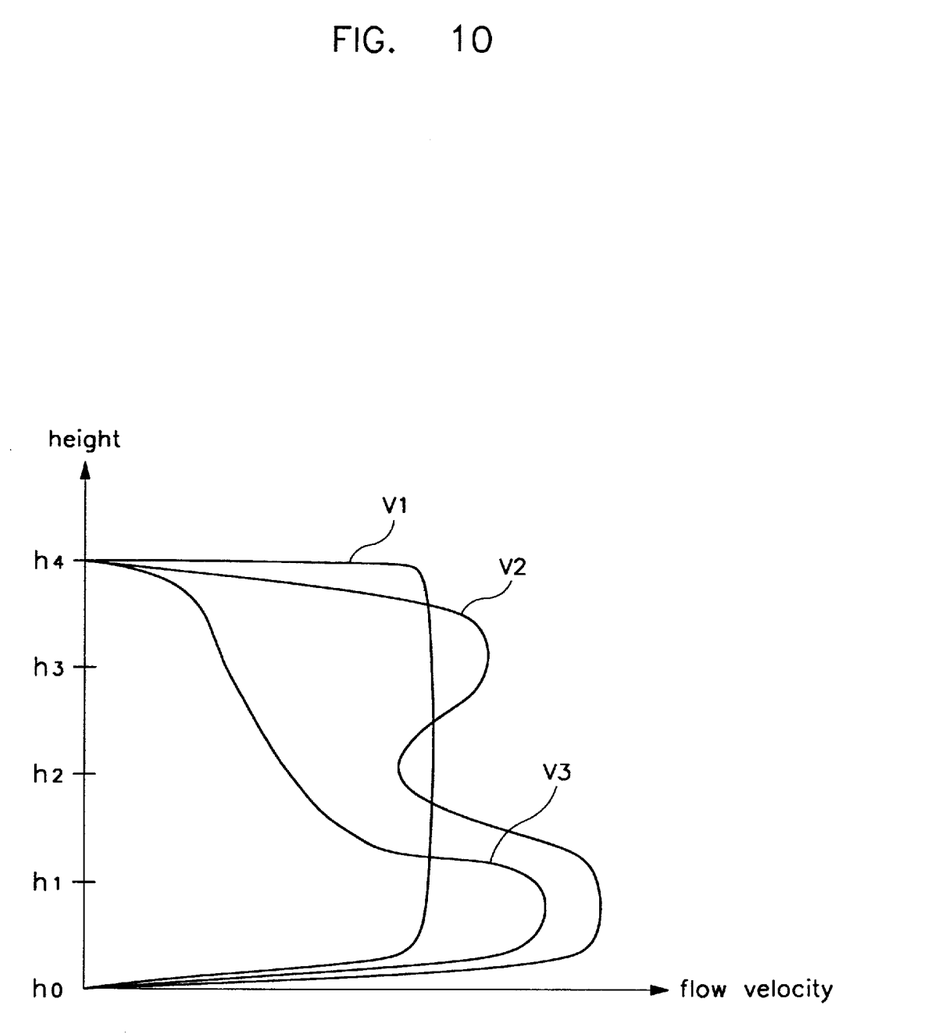
FIG. 10 illustrates an average flow velocity in a curved fluid passage.

But, in a curved fluid passage, a flow velocity of a lower part of the fluid passage and a flow velocity of a upper part of the fluid passage are variously changed as shown in FIG. 10(V2 and V3). Accordingly, a plurality of ultrasonic transducers are mounted to upper and lower stream sides according to a height of fluid passage, an ultrasonic transit time is measured at each stream position, average ultrasonic transit time about the ultrasonic transit times is calculated, thereby measuring a flow velocity. This will be described with reference to FIG. 11.

Figure 11:
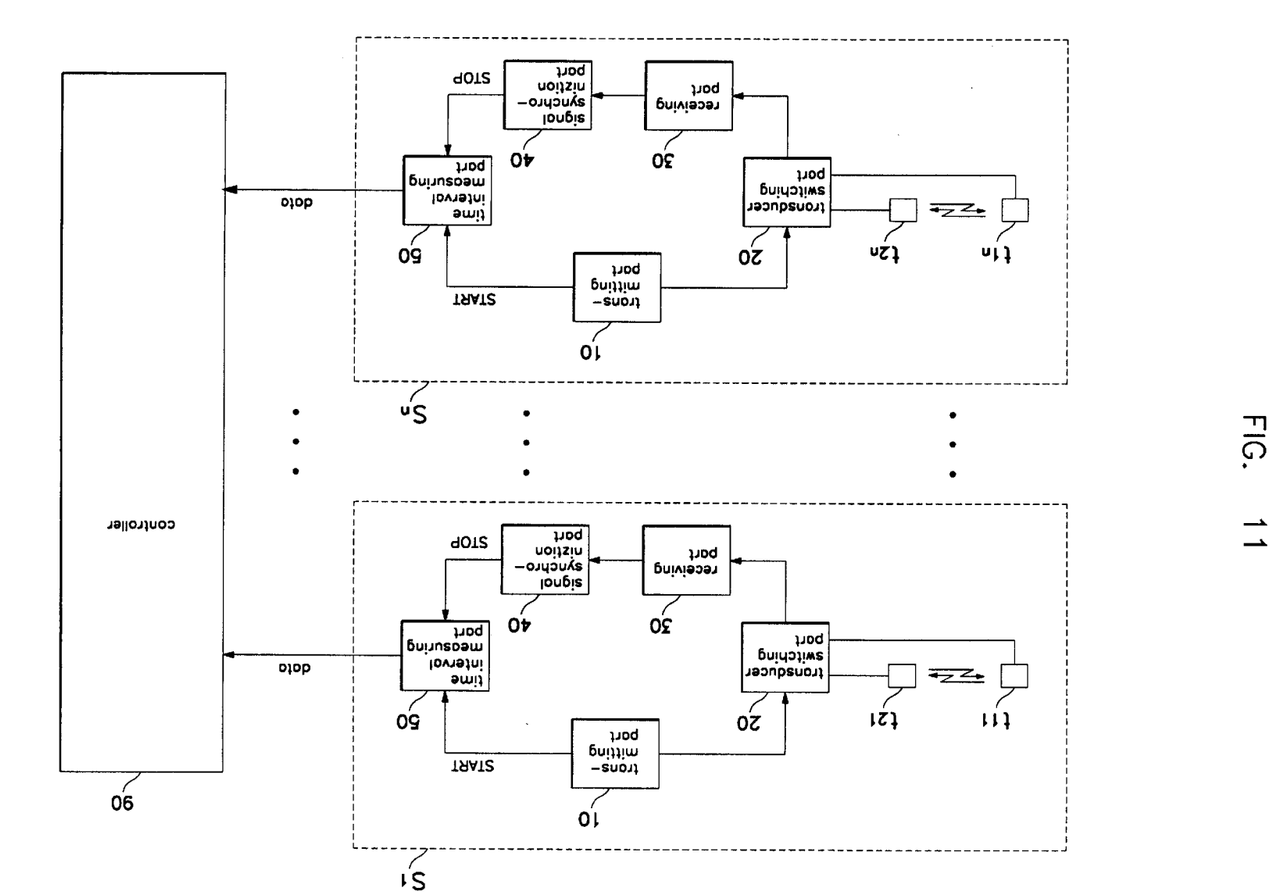
FIG. 11 is a block diagram of an ultrasonic flow velocity measuring apparatus according to a third preferred embodiment of the present invention.

FIG. 11 is a block diagram of an ultrasonic flow velocity measuring apparatus according to a third preferred embodiment of the present invention. A flow velocity at every installation position can be measured by using FIG. 11. The same parts as FIG. 6 will not be described below.

As show in FIG. 11, first set unit S1 to n-th set unit Sn each have a plurality of ultrasonic transducers [$(t_{11},t_{21})$ ... $(t_{1n},t_{2n})$] which are installed to different positions at upper and lower stream sides. In addition, the first set unit S1 to n-th set unit Sn commonly have a transmitting part 10, a transducer switching part 20, a receiving part 30, and the signal synchronization part 40, and the time interval measuring part 50. The first set unit S1 to n-th set unit Sn measure a transit time by using an ultrasonic beam having a modulated frequency according to PN codes having a different signal series. Therefore, each of the plurality of transducers [$(t_{11},t_{21})$ ... $(t_{1n},t_{2n})$] uses its own signal series PN code given to each transducer, thereby measuring a transit time in a locking state of a receiving signal's synchronization.

Figure 12:
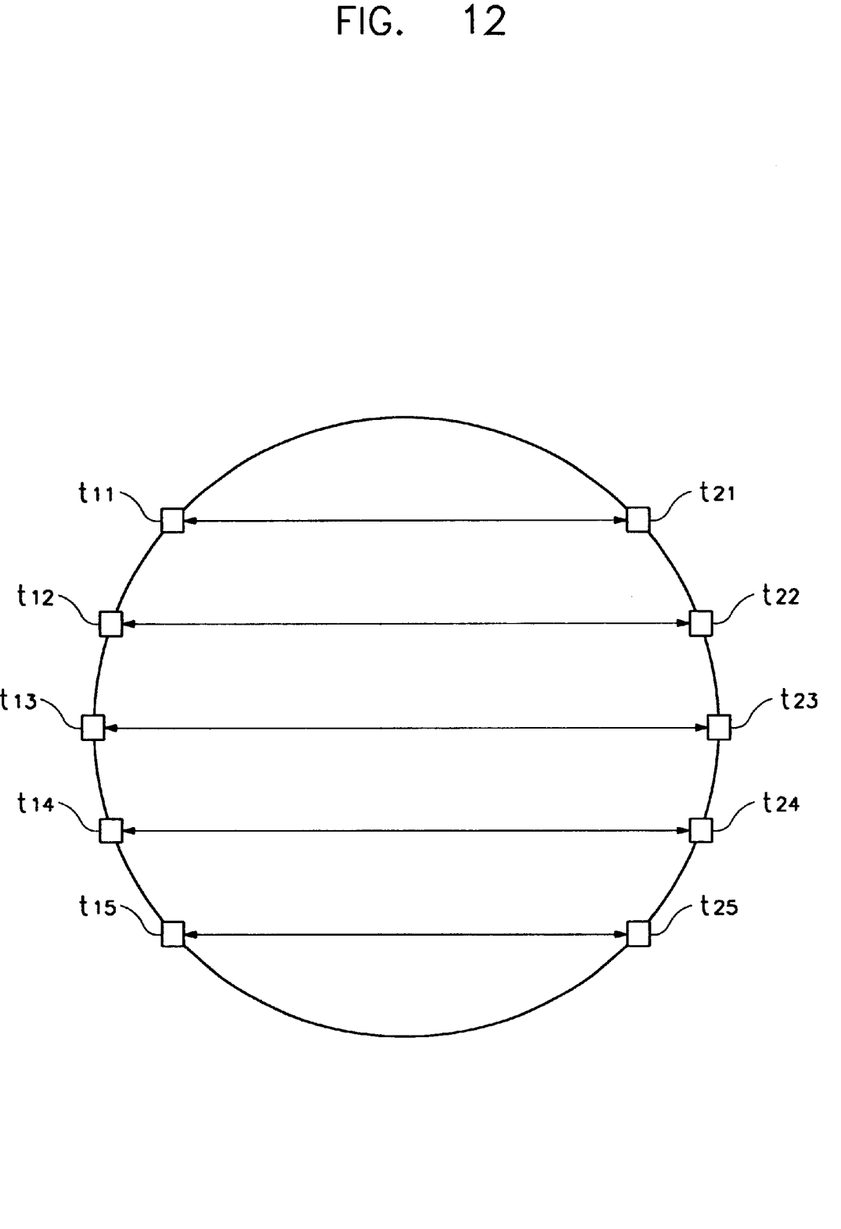
FIG. 12 illustrates an installation example of the ultrasonic transducers of FIG. 11.

The controller 90 is commonly connected to output terminals of the first set unit S1 to n-th set unit Sn. The controller 90 receives the output data of the time interval measuring parts 50 of the first set unit S1 to n-th set unit Sn, calculates a flow velocity at various positions, calculates average value among the calculated flow velocity values, and obtains average flow velocity of fluid. The output data of the time interval measuring part 50 means an ultrasonic transit time from a upper stream to a lower stream, and means an ultrasonic transit time from a lower stream to a upper stream. For instance, as shown in FIG. 12, five pairs of ultrasonic transducers $(t_{11},t_{21})(t_{12},t_{22})(t_{13},t_{23})(t_{14},t_{24})(t_{15},t_{25})$ are installed to upper and lower stream sides according to various heights of fluid passages. By the control of the controller 90, the plurality of ultrasonic transducers emit or receive frequency-modulated ultrasonic beams at the same time, an ultrasonic transit time is counted to obtain average ultrasonic transit time, and thus a flow velocity can be measured at various installation positions.

As described above, in the ultrasonic flow velocity measuring apparatus according to the present invention, one pair of ultrasonic transducers of a transmitting part alternately emit or receive the ultrasonic beam by using an ultrasonic beam having a frequency modulated according to PN code, an ultrasonic transit time difference is counted in a locking state of a signal synchronization, thereby measuring a flow velocity. Therefore, the ultrasonic flow velocity measuring apparatus precisely measures an ultrasonic transit time within allowable error range.

If the installation positions of the ultrasonic transducers of upper and lower stream sides are moved, an ultrasonic transit time can be precisely measured by using a different signal series PN code without changing an electronic component and a program.

It a plurality of ultrasonic transducers are installed to be faced therebetween according to a distance from the bottom of a fluid passage, and PN codes having a different signal series are set to the transmitting and receiving parts connected to the ultrasonic transducers, the present invention measures a flow velocity at each position by emitting or receiving ultrasonic beam at the same time, and measures average flow velocity. As a result, the present invention precisely measures average values of flow velocity variable according to a height of a curved fluid passage.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. In an ultrasonic flow velocity measuring apparatus which installs a pair of transducers one of the pair being at an upper stream and the other of the pair being at a lower stream of a fluid passage and measures a flow velocity according to an ultrasonic transit time difference between the ultrasonic transducers, an ultrasonic flow velocity measuring apparatus comprising:

a transmitting part for generating an ultrasonic signal having a modulated frequency according to a PN code of a diffusion band;

a transducer switching part for alternately applying the ultrasonic signal from the transmitting part to a pair of ultrasonic transducers, and switching a connection state of the pair of ultrasonic transducers for a transmitting or receiving operation;

a receiving part for demodulating an output signal of the transducer switching part and capturing a moment at which its own signal is identical with a signal of the transmitting part;

a signal synchronization part for locking a synchronization of a receiving signal when the receiving part capture a signal;

a time interval measuring part for measuring an ultrasonic transit time under the condition that a synchronization of a receiving signal is locked in the signal synchronization part; and a controller for controlling a switching operation of the transducer switching part, and calculating a flow velocity according to an ultrasonic transit time in opposition to a flow velocity measured by the time interval measuring part.

2. The ultrasonic flow velocity measuring apparatus as set forth in claim 1, wherein:

the transmitting part is comprised of a transmitting PN code generator, a frequency modulator, and an output amplifier, whereby the transmitting PN code generator includes an oscillator for generating a clock signal of a predetermined period therein, and generates PN code which is determined by a high-level pulse width and a low-level pulse width according to a clock signal generated by the oscillator.

3. The ultrasonic flow velocity measuring apparatus as set forth in claim 1, wherein:

the receiving part is comprised of a receiving amplifier, a frequency demodulator, and a signal capturing part, whereby the signal capturing part detects a moment at which a demodulated signal series is identical with a PN code signal series generated from the transmitting PN code generator.

4. The ultrasonic flow velocity measuring apparatus as set forth in claim 1, wherein:

the signal synchronization part is comprised of first and second synthesizers, first and second LPFs (low pass filters), a differential amplifier, a loop filter, a VCO (voltage controlled oscillatory and a receiving PN code generator, whereby the receiving PN code generator generates the same PN code as an output signal series of the transmitting PN code generator according to an input frequency of the VCO oscillator, after receiving an enable signal from the signal capturing part;

then, the receiving PN code generator generates a PN code of which phase is leading by a predetermined period of the first synthesizer, and generates a PN code of which phase is lagged by a predetermined period of the second synthesizer.

5. In an ultrasonic flow velocity measuring apparatus which installs a pair of transducers one of the pair being at an upper stream and the other of the pair being at a lower stream of a fluid passage and measures a flow velocity according to an ultrasonic transit time difference between the ultrasonic transducers, an ultrasonic flow velocity measuring apparatus comprising:

a transmitting part for selecting one PN code among a plurality PN code signal series according to a signal selection signal, and generating an ultrasonic signal having a modulated frequency according to the selected PN code;

a transducer switching part for alternately applying the ultrasonic signal from the transmitting part to a pair of ultrasonic transducers, and switching a connection state of the pair of ultrasonic transducers for a transmitting or receiving operation;

a receiving part for demodulating an output signal of the transducer switching part, and capturing a moment at which its own signal is identical with a signal of the transmitting part;

a signal synchronization part for locking a synchronization of a receiving signal when the receiving part captures a signal;

a time interval measuring part for measuring an ultrasonic transit time under the condition that a synchronization of a receiving signal is locked in the signal synchronization part; and a controller which generates a signal selection signal for selecting one PN code among a plurality of PN code signal series at the transmitting part and calculates a flow velocity according to an ultrasonic transit time in opposition to a flow velocity measured by the time interval measuring part.

6. An ultrasonic flow velocity measuring apparatus, comprising:

a plurality of set units which emit or receive an ultrasonic beam having a modulated frequency according to a different PN code, and measure an ultrasonic transit time; and a controller which collects the ultrasonic transit times measured by the plurality of set units, and calculates average flow velocity, wherein the set unit includes:

a pair of ultrasonic transducers which are disposed to be faced to each other at an effectively equal height of a fluid passage and the pair of ultrasonic transducers for each set unit are at a different height of a fluid passage;

a transmitting part for generating an ultrasonic signal having a modulated frequency according to a predetermined PN code;

a transducer switching part for alternately applying the ultrasonic signal from the transmitting part to a pair of ultrasonic transducers, and switching a connection state of the pair of ultrasonic transducers for a transmitting or receiving operation;

a receiving part for demodulating an output signal of the transducer switching part, and capturing a moment at which its own output signal is identical with an output signal of the transmitting part;

a signal synchronization part for locking a synchronization of a receiving signal when the receiving part capture a signal; and a time interval measuring part for measuring an ultrasonic transit time under the condition that a synchronization of a receiving signal is locked in the signal synchronization part.

* * * * *